(12) United States Patent
Degen et al.

(10) Patent No.: US 8,665,613 B2
(45) Date of Patent: Mar. 4, 2014

(54) SWITCHED MODE POWER CONVERTER AND METHOD OF OPERATION THEREOF

(75) Inventors: Peter Degen, Arnhem (NL); Humphrey De Groot, Vlijmen (NL); Jan Dikken, Wijchen (NL)

(73) Assignee: NXP B.V., Eindhoven (NL)

( * ) Notice: Subject to any disclaimer, the term of this patent is extended or adjusted under 35 U.S.C. 154(b) by 1436 days.

(21) Appl. No.: 11/908,670

(22) PCT Filed: Mar. 9, 2006

(86) PCT No.: PCT/IB2006/050747
§ 371 (c)(1),
(2), (4) Date: Jun. 13, 2008

(87) PCT Pub. No.: WO2006/095328
PCT Pub. Date: Sep. 14, 2006

(65) Prior Publication Data
US 2008/0278975 A1    Nov. 13, 2008

(30) Foreign Application Priority Data

Mar. 11, 2005  (EP) ..................................... 05101932
Mar. 16, 2005  (EP) ..................................... 05102068

(51) Int. Cl.
*H02M 3/335* (2006.01)
*H02M 3/338* (2006.01)

(52) U.S. Cl.
USPC ..................... 363/21.1; 363/21.06; 363/21.07

(58) Field of Classification Search
USPC ............... 363/20, 21.01, 21.04–21.07, 21.09, 363/21.1, 21.11, 21.18
See application file for complete search history.

(56) References Cited

U.S. PATENT DOCUMENTS

| | | | | |
|---|---|---|---|---|
| 36,098 | A | * | 8/1862 | Vinciarelli ..................... 126/524 |
| 4,058,758 | A | * | 11/1977 | Peterson .......................... 363/80 |
| 5,331,533 | A | | 7/1994 | Smith et al. |
| 5,907,481 | A | | 5/1999 | Svardsjo |
| 6,061,255 | A | * | 5/2000 | Chik et al. ................. 363/21.06 |
| 6,166,932 | A | * | 12/2000 | Otoshi ....................... 363/56.03 |
| 6,252,783 | B1 | * | 6/2001 | Huh et al. .................. 363/21.01 |

(Continued)

FOREIGN PATENT DOCUMENTS

| | | |
|---|---|---|
| CN | 1304206 A | 7/2001 |
| EP | 0687057 A1 | 12/1995 |

(Continued)

*Primary Examiner* — Adolf Berhane
*Assistant Examiner* — Nusrat Quddus

(57) ABSTRACT

The invention relates to a switched mode power converter and a method of operating such a converter A switched mode power converter according to the invention includes a transformer (2) having a primary winding (2a) and at least one secondary winding (2b) and a secondary side rectifier circuit including an output filter (6, 10) coupled to the at least one secondary winding (2b), and a secondary side active switch device (S3) coupled between the at least one secondary winding and the output filter. The converter further includes primary side and secondary side control means (12, 16, 18) for regulating the switching of the primary side and secondary side switches, respectively, and configured so as to reduce the duty cycle of the primary side switch device (S1) during a lower power mode of operation of the converter, the reduction of the duty cycle of the primary side switch being determined with reference to the duty cycle of the secondary side switch (S3). This leads to a substantial increase in the efficiency of operation in the low power mode.

12 Claims, 12 Drawing Sheets

(56) References Cited

U.S. PATENT DOCUMENTS

| | | | |
|---|---|---|---|
| 6,771,059 B1* | 8/2004 | Zwicker | 324/119 |
| 6,845,018 B2* | 1/2005 | Ohishi | 363/21.06 |
| 7,102,251 B2* | 9/2006 | West | 307/64 |
| 7,183,756 B1* | 2/2007 | Dikken et al. | 323/280 |
| 7,529,106 B2* | 5/2009 | Hikosaka | 363/44 |
| 7,589,982 B2* | 9/2009 | Wang et al. | 363/21.06 |
| 2003/0067794 A1 | 4/2003 | Boylan et al. | |
| 2004/0136207 A1 | 7/2004 | Havanur | |
| 2005/0146901 A1* | 7/2005 | Yamada | 363/21.01 |
| 2006/0072349 A1* | 4/2006 | Lin | 363/21.06 |
| 2008/0304291 A1* | 12/2008 | Degen et al. | 363/21.06 |
| 2009/0310389 A1* | 12/2009 | Balakrishnan et al. | 363/21.15 |

FOREIGN PATENT DOCUMENTS

| | | |
|---|---|---|
| JP | 5-122929 A | 5/1993 |
| JP | 8-098523 A | 4/1996 |
| WO | 2005011097 A2 | 2/2005 |

* cited by examiner

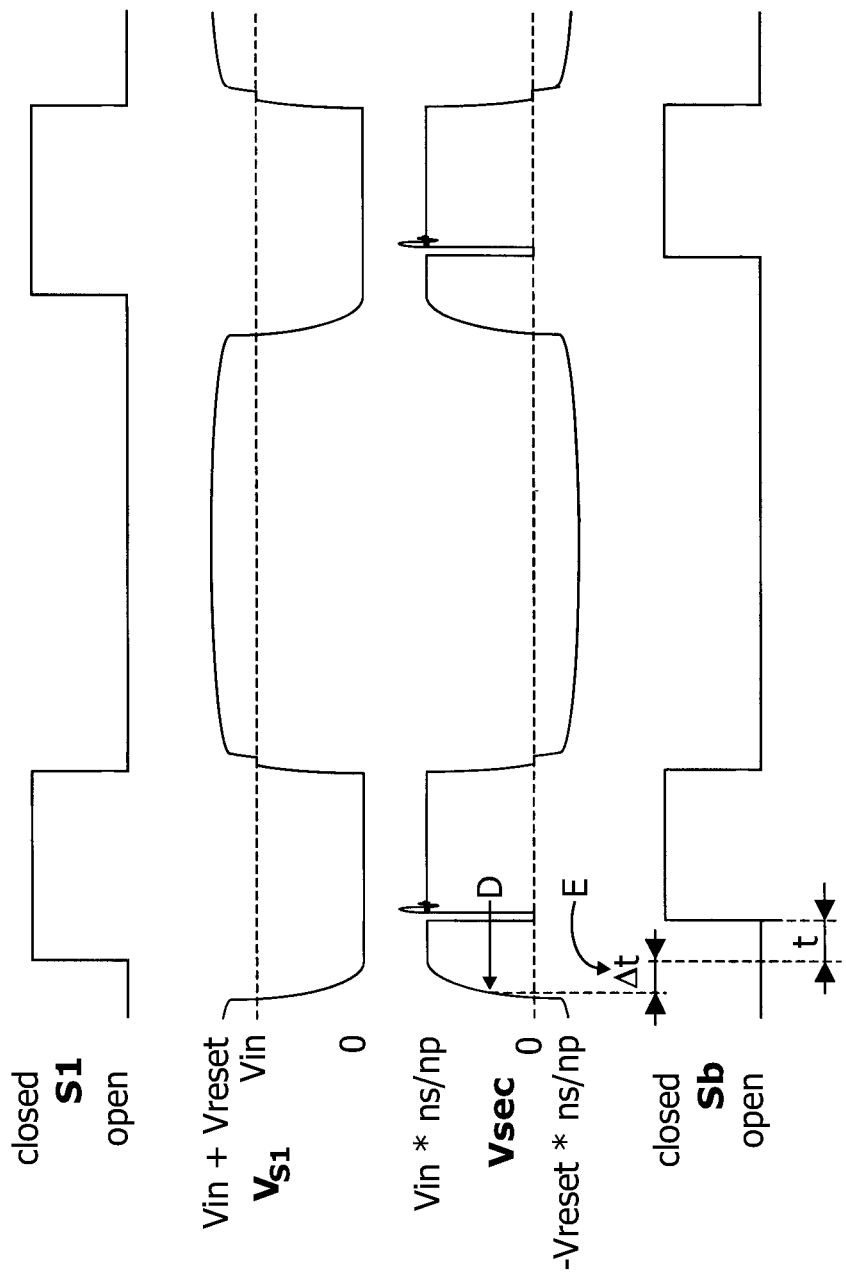

SWITCHED MODE POWER CONVERTER AND METHOD OF OPERATION THEREOF

The present invention relates to the field of power conversion. In particular, the invention relates to a switched mode power converter and a method of operating such a converter.

Switched mode power converters are widely used in the electronics industry to convert one DC level voltage to another for supply to a load. Typically, a transformer is provided which isolates the voltage source on the primary side from the load on its secondary side. The input DC voltage is periodically switched across the primary side of the transformer using one or more power switches. Energy is stored in an output inductor and a regulated voltage is supplied to the load on the secondary side by switching the flow of current into the output inductor.

Two diodes on the secondary side rectify the switched and isolated voltage across the secondary winding, including a forward diode connected in series with the secondary winding that conducts current to the load when a positive voltage is present across the secondary winding, and a freewheeling diode connected in shunt with the secondary winding that conducts current to the load when no voltage or a negative voltage is present across the secondary winding.

In order to improve the efficiency of such a circuit, it is known to replace one or both of the rectifying diodes with switches, for example MOSFET devices that are modulated by control means.

US-A-2004/0136207 discloses a switched mode power converter in which the forward diode is replaced by two MOSFET devices arranged with their sources connected together, and their gates connected together so that the two devices are activated concurrently.

In view of the general need for greater energy efficiency, it is desirable to provide power converters which operate with greater efficiency, whilst minimising any additional cost associated with any new design. In particular, in view of the widespread use of personal computers (PCs), any small improvement in the efficiency of their power supplies can have a significant impact.

The present invention provides a switched mode power converter including:
- a transformer having a primary winding and at least one secondary winding;
- a primary side active power switch device coupled to the primary winding for selectively applying an input voltage to the primary winding;
- a secondary side rectifier circuit including an output filter coupled to the at least one secondary winding, and a secondary side active switch device coupled between the at least one secondary winding and the output filter; and
- primary side and secondary side control means for regulating the switching of the primary side and secondary side switches, respectively, and configured so as to reduce the duty cycle of the primary side switch device during a lower power mode of operation of the converter, the reduction of the duty cycle of the primary side switch being determined with reference to the duty cycle of the secondary side switch.

Existing power converters operate with poor levels of efficiency, even during a so-called "stand-by" or lower power mode of operation when the load on the converter is reduced. According to the invention, the control means operates to reduce the duty cycle of the primary side active power switch in the stand-by mode, minimising the time taken to transfer energy from the primary side to the secondary side of the transformer. This leads to a substantial increase in the efficiency of operation in the stand-by mode.

In embodiments, the secondary side control means is arranged to receive an input signal indicative of turn-on of the primary side switch, and generate an output signal dependent on the input signal and the turn-on time of the secondary side switch, the output signal being coupled to the primary side control means.

Preferably, the converter is operable to selectively generate a continuous output current, or a discontinuous output current, the discontinuous output current being obtained by reducing the duty cycle of the secondary side switch device. If the system is used for a PC power supply then mostly during normal mode the system is in continuous mode. In standby mode, it can be either in continuous or in discontinuous mode, depending on the required output power. In stand-by mode the duty cycle is even further reduced when the system operates in discontinuous mode, to increase the efficiency even further.

The control means may be configured to adjust the duty cycle of the primary side switch device such that it is substantially equal to that of the secondary side switch device during the stand-by mode.

In a preferred embodiment, the control means is configured firstly to reduce the operating duty cycle of the converter during the stand-by mode relative to that during the normal mode (whilst leaving its operating frequency unchanged). When at a certain point the on-period of the primary switch device achieves its minimum time to achieve zero voltage switching of the main primary switch (typically 1 to 2 microseconds and defined by the primary controller), the frequency of the primary side switch device is reduced further. As the on-period is kept constant, this results both in a lower duty cycle and a lower frequency, giving a further efficiency improvement. This is because the efficiency of the converter is largely determined by the time for which the transformer operates to transform energy from the primary side to the secondary side.

The magnetic losses of a transformer can be expressed as:

$$P_{loss} = C * f^a * \Delta B^b$$

where C is a constant, f is the frequency and B is the magnetic field density. The values of a is typically about 1 to 1.5, whereas b is typically of the order of 2 to 2.5. Reducing the duty cycle of the converter automatically reduces the value of the magnetic field density. As in the formula b is higher then a, this gives the highest efficiency increase.

In one implementation, the control means is configured to receive a signal indicative of the voltage across the at least one secondary winding and determine the turn-on time of the primary side switch device therefrom. As in discontinuous mode the duty cycle of the primary side active switch depends on the output current, communication or coupling between the secondary and primary sides of the converter circuit may be required. A positive edge change in the voltage across the secondary winding is indicative of the primary side active switch turning on and the control means is operable to measure the time between this change and the turn-on of the secondary side switch device, and to adjust the duty cycle of the primary side switch device as appropriate in response to this time period.

In further embodiments, a capacitive means is coupled between the drain of the secondary side switch device and ground.

The control means may include a valley detection circuit for monitoring the voltage across the primary side switch device, the turn-on of the primary side switch device being dependent on the output thereof. At minimum load, the primary side switch device may not turn on whilst zero voltage is applied across it. Therefore, a valley detection circuit may be employed to detect when the minimum voltage is across the switch, so that the switch can be turned on at that time. This may be implemented without requiring a coupling, such as an opto-coupler between the primary and secondary side control means.

This valley detection circuit may also be used in the higher power mode to determine the turn-on time of the primary main switch.

In another preferred embodiment, a capacitive means is coupled between the drain of the secondary side switch device and ground. In operation of the circuit, the voltage across the capacitor will always be positive, enabling the secondary side switch device to be turned on at any time. In particular, the presence of this capacitive means may enable the control means to be configured to regulate the switching of primary side switch device such that its duty cycle is shorter than that of the secondary switch device.

Power converters of the kind described herein may be particularly suitable for inclusion in a PC power supply, for example to provide an efficient 5V stand-by output supply.

The invention further provides a method of operating a switched mode power converter including:

a transformer having a primary winding and at least one secondary winding;

a primary side active power switch device coupled to the primary winding for selectively applying an input voltage to the primary winding;

a secondary side rectifier circuit including an output filter coupled to the at least one secondary winding, and a secondary side active switch device coupled between the at least one secondary winding and the first output filter; and primary and secondary side control means for regulating the switching of the respective switch device and operable to generate a continuous output current during a normal mode of operation of the converter, the method comprising the step of reducing the duty cycle of the primary side switch device during the lower power mode relative to its duty cycle during the higher power mode.

The method may include a further step of reducing the duty cycle of the secondary side switch device during a lower power mode of operation of the converter to generate a discontinuous output current.

A prior art arrangement and embodiments of the invention will now be described by way of example and with reference to the accompanying schematic drawings, wherein:

FIG. 8B shows exemplary waveforms generated during operation of the circuit shown in FIG. 8A;

The same reference signs are generally used to refer to corresponding or similar features in modified and different embodiments shown in the Figures.

Figure 1:
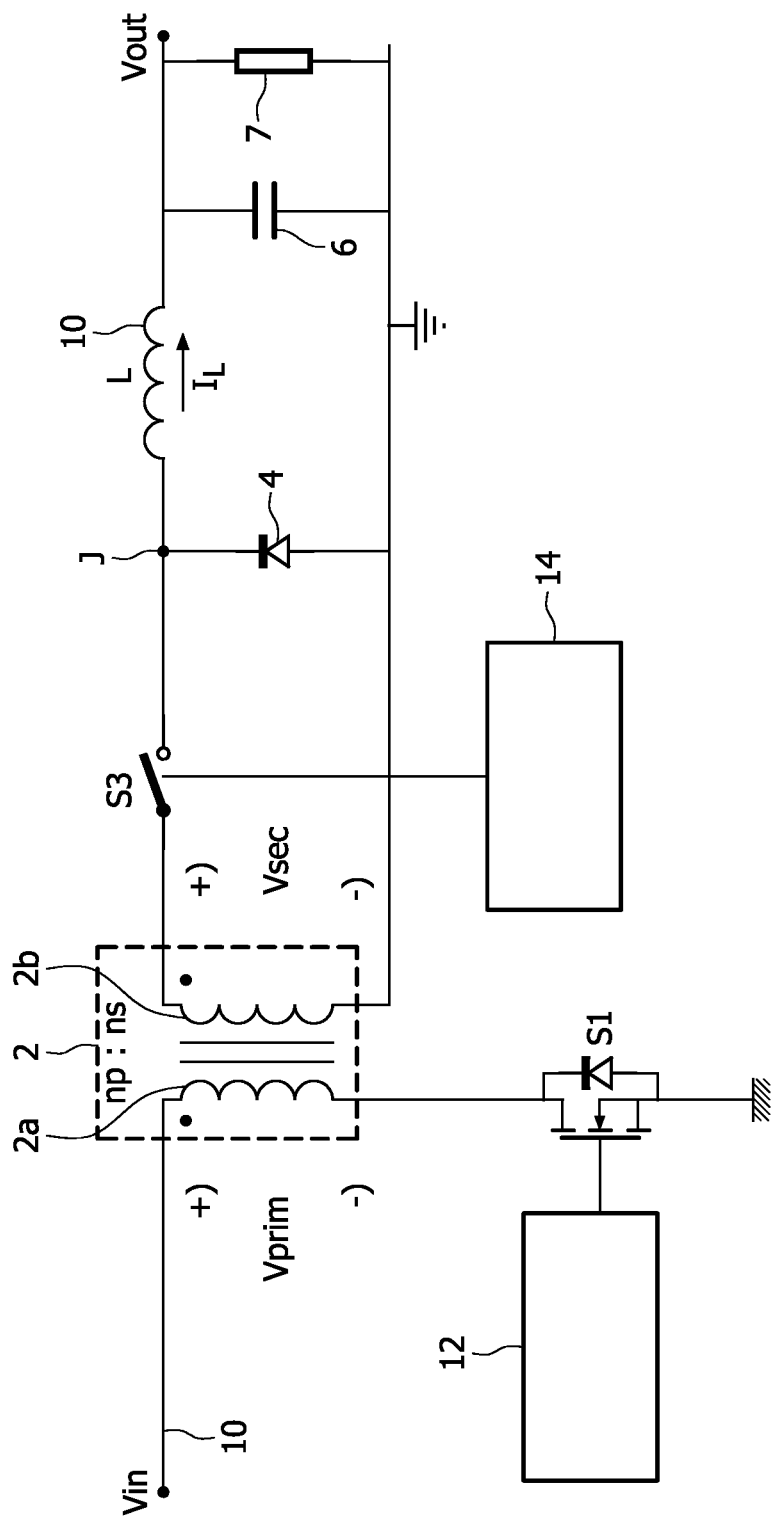
FIG. 1 shows a circuit diagram of a known forward converter.

FIG. 1 shows a known power converter configuration, in particular a forward converter. It includes a transformer 2 having a primary winding 2a and a secondary winding 2b. The dot end of the primary winding 2a is coupled to an input voltage source Vin and the other end of the primary winding is coupled to ground through power switch S1.

Power switch S1 comprises a MOSFET device having a drain terminal coupled to the primary winding 2a, a source terminal coupled to ground, and a gate terminal coupled to a primary side controller 12. The controller 12 provides periodic activation signals to the power switch S1.

On the secondary side, a switch S3 is coupled between the dot end of the secondary winding 2b and an output inductor 10. The anode of a freewheeling diode 4 is connected to ground and its cathode is connected to a node J between switch S3 and the inductor 10. The output inductor 10 is further coupled to an output terminal, with a capacitor 6 coupled between the output terminal and the ground. The output inductor 10 and the capacitor 6 form a filter that provides a smooth DC output voltage Vout at the output terminal relative to ground. A secondary side controller provides periodic activation signals to the secondary side power switch S3. The circuit of FIG. 1 is operable in a well known manner to provide an output voltage, and a load 7 is coupled to the output terminal.

At low loads, the circuit may switch from continuous to discontinuous mode as will now be described with reference to FIGS. 2 to 5.

Figure 2:
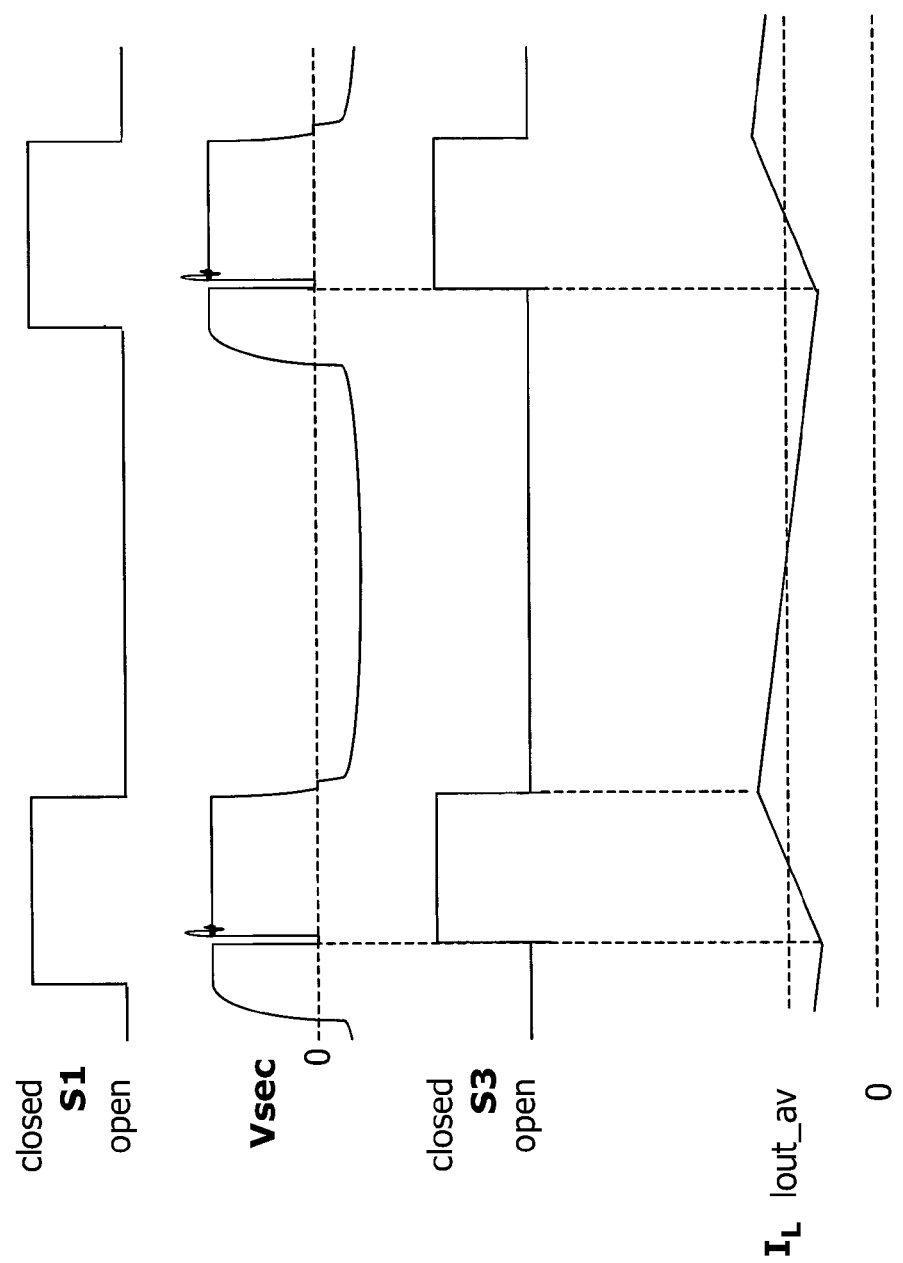
FIGS. 2 to 4 show exemplary waveforms generated during operation of the circuit shown in FIG. 1.

Waveforms generated by operation of the circuit shown in FIG. 1 in continuous mode are illustrated in FIG. 2. The waveforms labelled S1 and S3 show the status of the respective switches, as operated by control signals received from controllers 12 and 14, respectively. Waveform "Vsec" represents the voltage across the secondary winding 2b of a transformer 2. Waveform "$I_L$" indicates the current through the output inductor 10. The average of $I_L$ is marked as "Iout_av" which is drawn by the load from output terminal Vout.

In continuous mode the duty cycle of switch S1 is made inversely dependent on the input voltage Vin. In continuous conduction mode (CCM) the output voltage equals:

$$Vout = \delta * Vin * \frac{ns}{np}$$

whereas δ is the duty cycle of the system, np and ns are respectively the number of primary and secondary windings of transformer 2. From this formula, the duty cycle of the system can be derived:

$$\delta = \frac{Vout}{Vin} * \frac{np}{ns}$$

Assuming Vout and the number of windings are constant, the duty cycle is inversely proportional to Vin. In the system of FIG. 1, the duty cycle of switch S1 is made inversely proportional to Vin in such a way that with switch S3 the required output voltage can be achieved by regulation of switch S3. The duty cycle of S1 will be larger than the duty cycle of S3, so transients (sudden load increase/decrease) can be handled by switch S3 without changing the duty cycle of S1.

From the above can be concluded that in continuous mode the duty cycle of the system is independent of the output current.

Figure 3:
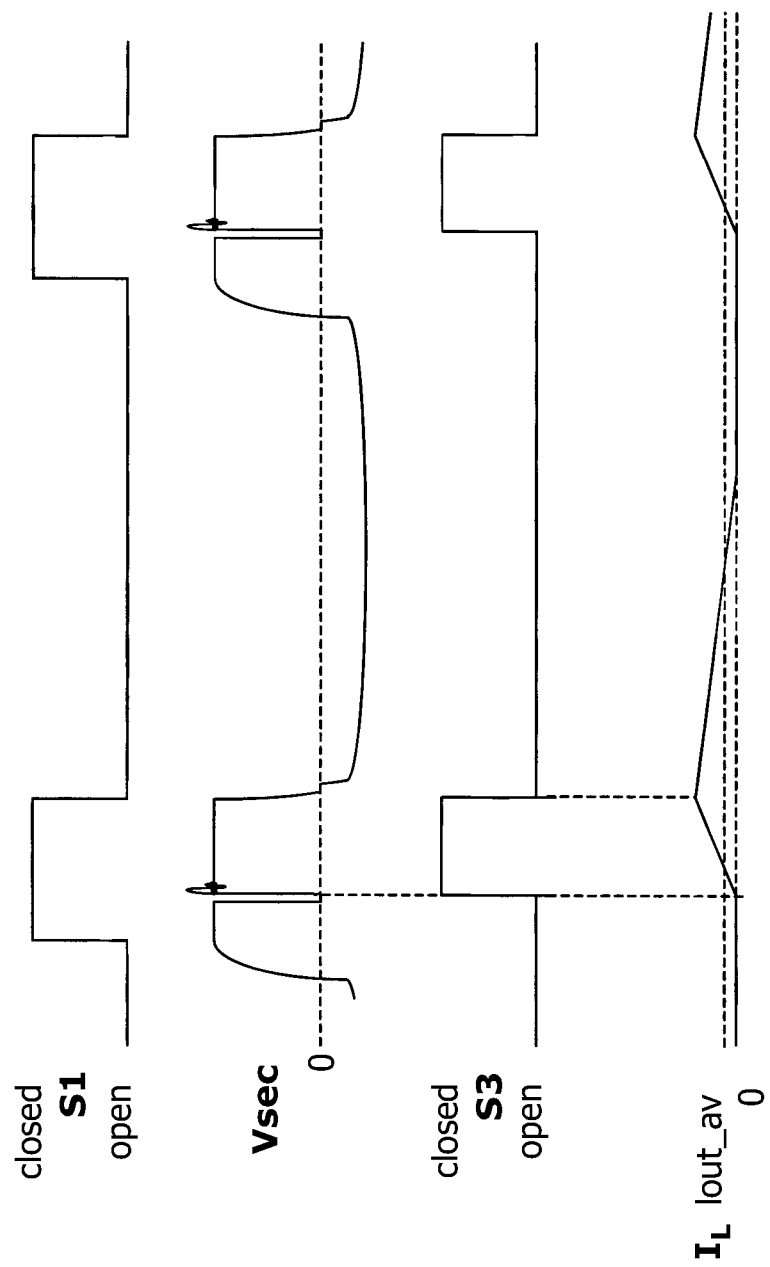

When operating in discontinuous mode, the waveforms illustrated in FIG. 3 may be generated. It can be seen that the current through the output inductor periodically drops to zero.

Figure 4:
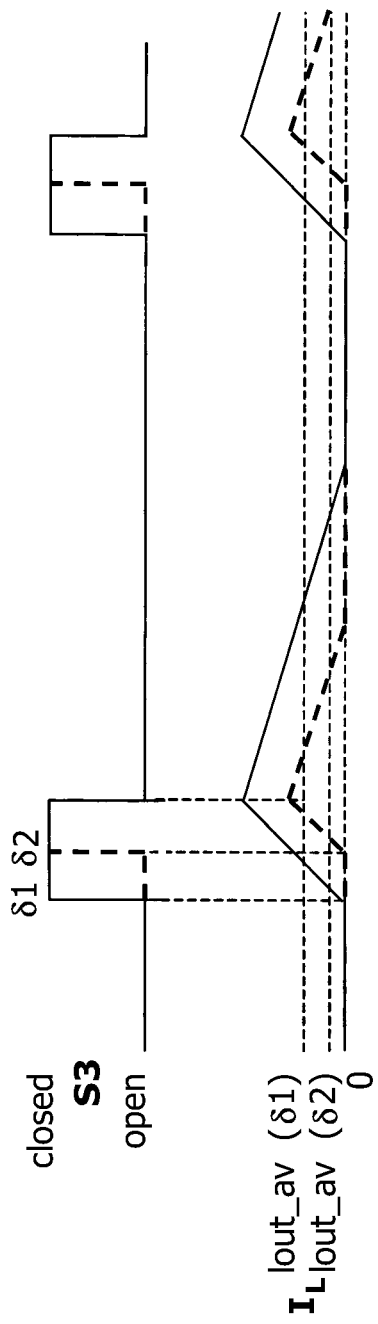

Waveforms generated during operation of the circuit in discontinuous mode with two different duty cycles are shown in FIG. 4, the shorter duty cycle producing the dashed waveforms. The longer duty cycle generates a greater average output current, $Iout_{av}$ ($\delta 1$), relative to that generated by the shorter duty cycle, $Iout_{av}$ ($\delta 2$). The average output current equals the average current through the output inductor. The ripple of the current through the output inductor is filtered by the output capacitor. Therefore the output current equals a substantially constant value.

In FIG. 4, it can be seen that when the output current decreases, the duty cycle also decreases, so the duty cycle of the system is a function of the output current Iout.

Figure 5:
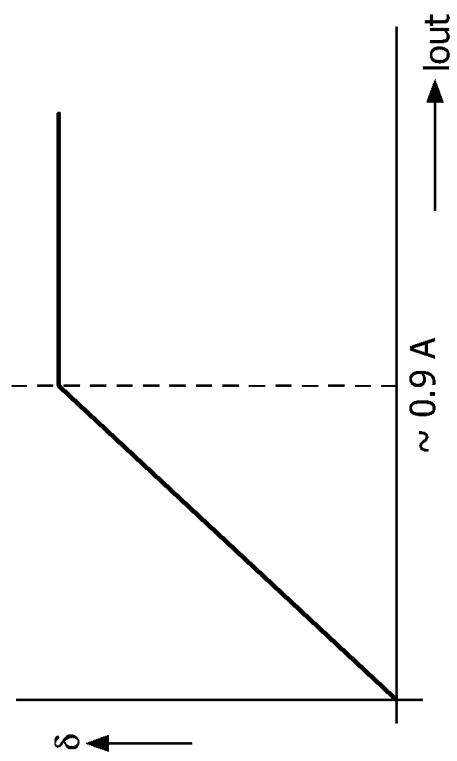
FIG. 5 shows a graph of duty cycle against output current.

In discontinuous mode, the duty cycle of switch S1 (as determined by the primary side controller 12) is also dependent on the output current. By way of illustration, FIG. 5 shows a plot of duty cycle, $\delta$ on the vertical axis, against output current, with the transition from discontinuous to continuous mode occurring at an output current of 0.9 A, for example.

According to an embodiment of the present invention, the control means of the power converter operate to reduce the duty cycle of primary side switch S1. For example, this method enables the converter to achieve an efficiency of 50% or better when supply a 500 mW load. To achieve this control, communication between the secondary and primary sides of the circuit is required.

Reducing the duty cycle of S1 reduces the time for which energy is transferred from the primary side to the secondary side, leading to an increase in efficiency.

Figure 6:
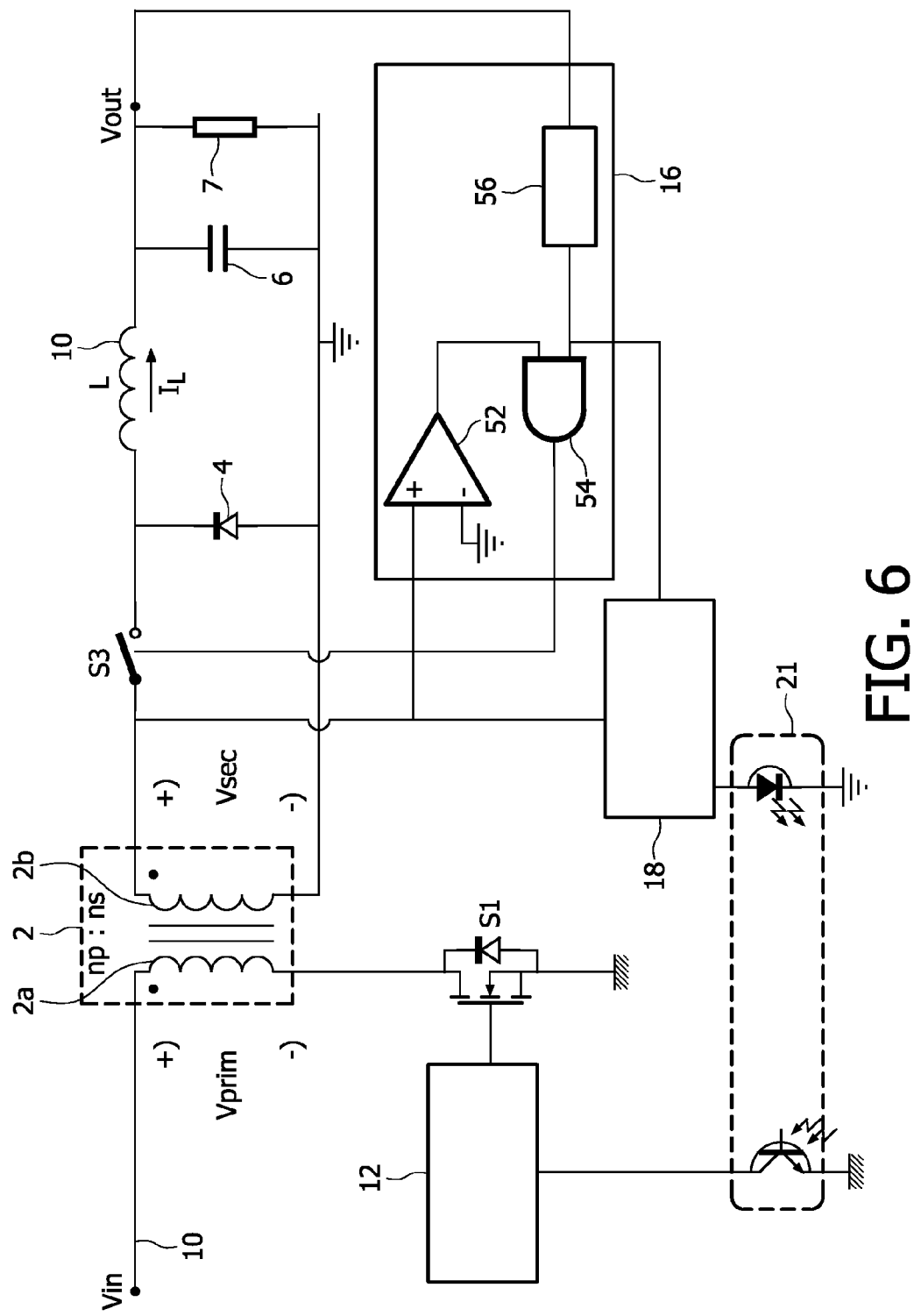
FIG. 6 shows a circuit diagram of a forward converter according to a first embodiment of the invention.

A circuit diagram of a power converter embodying the invention is shown in FIG. 6.

The control means comprises two regulation circuits on the secondary side, namely a first regulation circuit 16, and a second regulation circuit 18. The control means also includes a primary side controller 12. An output from circuit 18 is coupled to primary side controller 12 via an opto-coupler 21.

The first regulation circuit 16 may include a known current or voltage mode control regulator for example. It defines the duty cycle of S3. The implementation shown in FIG. 6 consists of a known current or voltage regulator 56, a comparator 52 and a digital AND port 54.

The output voltage is compared with a reference voltage in the current or voltage regulator 56. If the output voltage is below the required reference voltage, its output is actively high. This output of the regulator is connected to the input of the digital AND port 54. This AND port is required because the turn-on of S3 may only occur on the condition the voltage on the secondary side of the transformer is positive. Therefore the other input of the digital AND port is connected to comparator 52. The inputs of the comparator are connected to the secondary voltage Vsec and ground, respectively. The output of comparator is actively high when Vsec is positive.

Second regulation circuit 18 compares the duty cycle of S1 with the duty cycle of S3 (or to be more accurate, with the time S3 should be on according the regulator 56; this has the advantage of a faster increase of the primary duty cycle at a sudden load increase) and adjusts the duty cycle of S1, reducing it when appropriate to reduce the power consumption of the circuit, and in a particular method of operation, making the duty cycle of S1 equal to that of S3. This may be achieved in the manner described below, for example.

The second regulation circuit 18 measures the voltage on the secondary side of the transformer. When this is at a maximum, this indicates that S1 has turned on. The second regulation circuit receives the S3 control signal from the first regulation circuit 16, indicating when S3 should be turned on (as determined by regulator 56). A signal indicative of the time difference between these two events is sent by the second regulation circuit 18 to the primary side controller 12, which adjusts the duty cycle of S1 in response to that signal.

In the operation of this arrangement, if there is a sudden increase in the output current, the duty cycle needs to increase when the system is in discontinuous mode. However, as S3 cannot be turned on before S1 is turned on, the control means must first increase the duty cycle of S1 before it can increase the duty cycle of S3. This delay may lower the transient response of the system and may be avoided by ensuring that the duty cycle of switch S1 is larger than that of switch S3, although this may slightly reduce the overall efficiency of the system.

Figure 7:
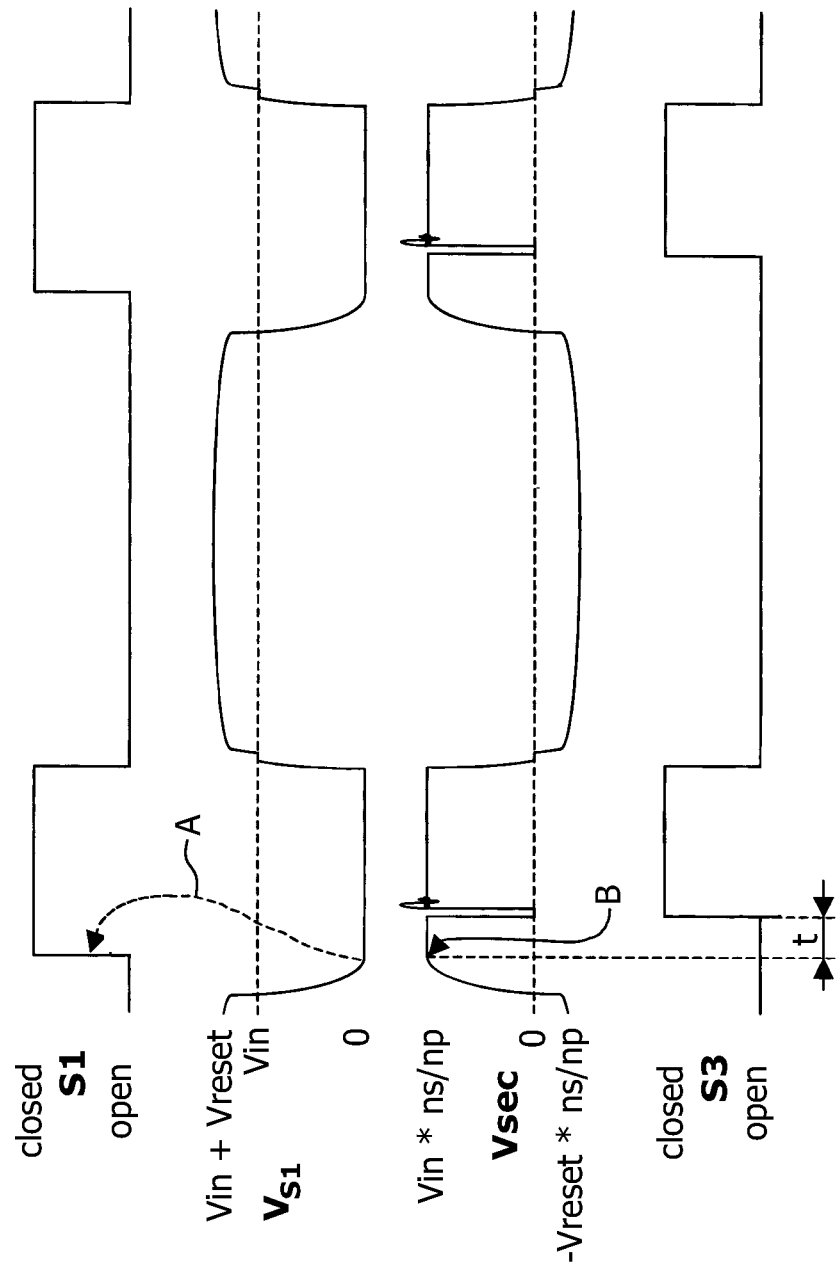
FIG. 7 shows exemplary waveforms generated during operation of the circuit shown in FIG. 6.

FIG. 7 shows exemplary waveforms generated during the operation of the circuit shown in FIG. 6. The waveform "$V_{S1}$" represents the voltage across switch S1. Its maximum value is equal to input voltage Vin, plus Vreset, where Vreset is the reversed voltage across the transformer required to reset this transformer.

The waveforms of FIG. 7 assume zero voltage switching of S1 (indicated by arrow "A"), which is possible when using an active clamp reset mechanism (not shown) on the primary side in combination with keeping switch S3 open during the time $V_{S1}$ is zero. A valley detection circuit within controller 12 is used to control the turn-on of S1.

At the turn-on of S3 the voltage across the secondary side of the transformer may temporarily drop to zero, depending on the output current. During this period the current is commutated from diode 4 to the transformer and switch S3.

The second regulation circuit 18 operates to reduce the time interval marked as "t" (between turn-on of S1 and turn-off of S3) by reducing the duty cycle of S1 to be closer to that of S3. The start of interval "t" is estimated by monitoring the voltage on the secondary side of the transformer, and using peak detection to determine when it reaches a maximum, indicating that S1 has turned on (at the point denoted by arrow "B" in FIG. 7).

To ensure that the voltage across S1 falls to an acceptable level before it is switched on, the on-time of S1 has a minimum value. This minimum value gives a minimum magnetising current that eventually discharges the parasitic capacitance of S1. Once the duty cycle of S1 has been reduced until its minimum on-time is reached (typically 1 to 2 microseconds to assure near zero voltage switching), the efficiency of the circuit may be reduced further by lowering the frequency of operation and keeping this minimum on-time, as this leads to a further reduction in duty cycle.

Figure 8A:
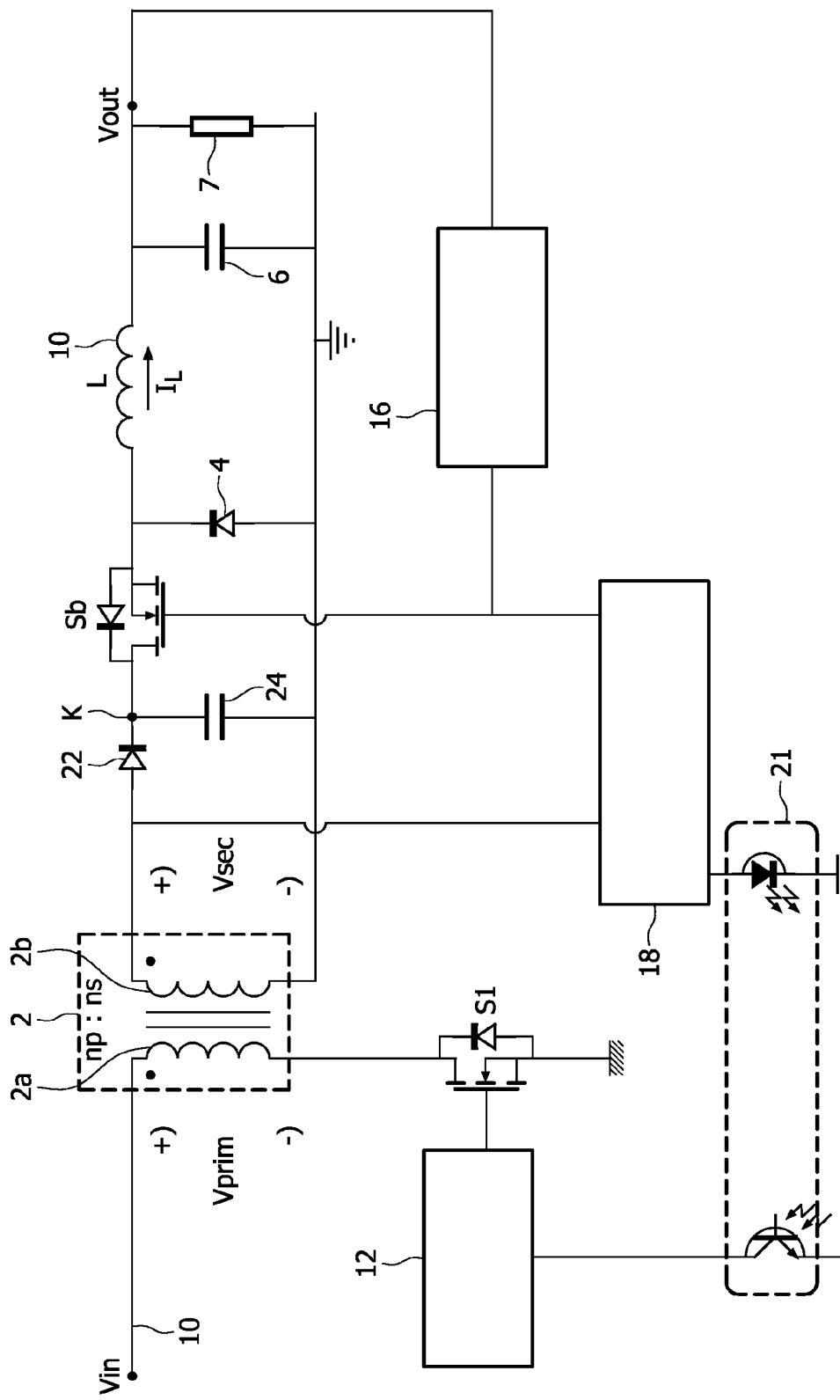
FIG. 8A shows a circuit diagram of a forward converter according to a second embodiment of the invention.

A circuit diagram illustrating a second embodiment of the invention is shown in FIG. 8A. It provides means by which to improve the transient response of the system.

In FIG. 8A, switch S3, which is shown schematically in FIG. 6, is shown in more detail. In particular, a rectifying diode is connected in series with the dot end of the secondary winding 2b of the transformer 2, and a MOSFET switch device Sb is coupled in series with the diode and the output inductor 10. The drain of Sb is connected to the diode, its source connected to the inductor, and its gate connected to first and second regulation circuits 16, 18.

A capacitor 24 is connected to a node "K" between diode 22 and switch Sb, and ground. During operation of the circuit, the voltage across the capacitor will always be positive, because it will be charged when the voltage on the secondary side of the transformer is positive, and will not be discharged when it becomes negative, as this discharge will be blocked by the diode 22. This enables the switch Sb to turn on at any time, as the load may draw current from the capacitor via switch Sb if necessary.

To minimise the size of the capacitor 24 (and therefore its cost), the diode 22 and switch Sb should be conducting at the same time. Therefore the duty cycles of Sb and S1 should be continuously synchronised. This ensures that most of the output current is delivered by the transformer, rather than from the capacitor. In some cases, it may be preferable to reduce the duty cycle of S1 to less than that of Sb when capacitor 24 is present.

Another advantage resulting from the inclusion of capacitor 24 is that, under steady state conditions, current is drawn on the secondary side of the transformer only when its voltage reaches a certain high level. This ensures that S1 is turned on when the voltage across it reaches a minimum value.

The presence of capacitor 24 means that the duty cycle of S1 does not have to be as precisely measured. For example, a more cost effective method (relative to peak detection) is to carry out this estimation using a level detector, as illustrated by FIG. 8B.

The system of FIG. 6 requires a peak detector, as illustrated by the waveforms of FIG. 7. This is because it is necessary to know exactly when switch S1 is turned on. A peak detector is practically feasible, but may be more complex to implement than a level detector.

When using the capacitor of FIG. 8A, the time that S1 is turned on need not be known as accurately, because any "mismatch" in timing between S1 and S3 (or Sb in FIG. 8A) can be compensated by the capacitor. If for example Sb is turned on before S1 is turned on, it will draw current from the capacitor and once S1 is turned on, the capacitor is charged again.

As the turn-on time of S1 does not need to be known exactly, it can be estimated. S1 is turned on when the voltage across this switch is minimal, that is when the voltage on the secondary side reaches its maximum. The time of this event is estimated monitoring the secondary voltage to detect when it reaches a certain level denoted "D" in FIG. 8B (say 10V) and allowing a predetermined time thereafter, Δt, which is an estimation of the time taken for Vsec to reach its maximum value from level D. This identified the time denoted "E" in FIG. 8B. This approach may be implemented using a comparator together with a delay circuit, which is less complex and more reliable then a peak detector.

Furthermore, owing to the presence of capacitor 24, turn-on of Sb has little if any influence on the voltage across S1 at the time of turn-on of S1.

Figure 10A:
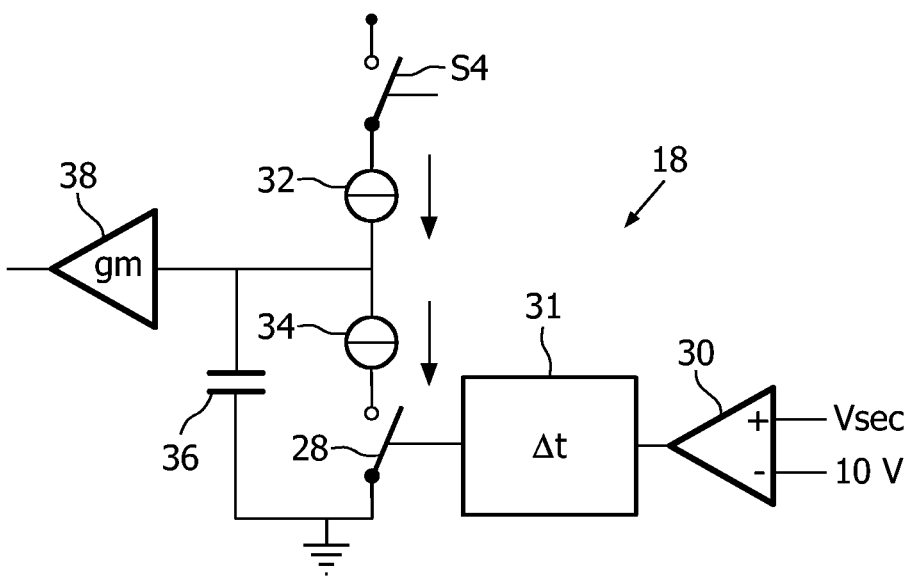
FIGS. 10A and 10B show circuit diagrams of part of a preferred implementation of the embodiment shown in FIG. 8A.
Figure 10B:
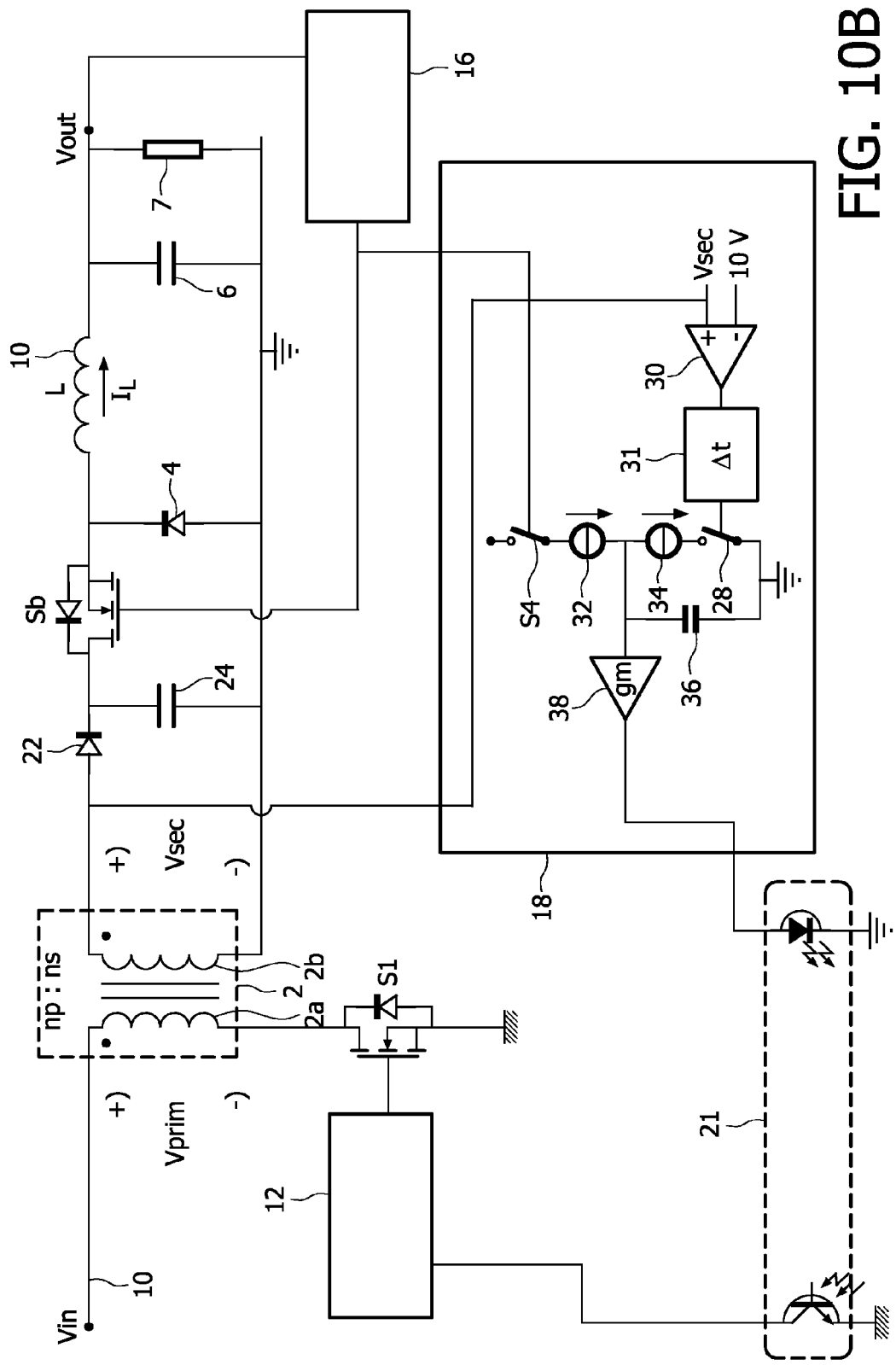

By way of example, a possible implementation of the second regulation circuit 18 of FIG. 8A employing a level detector circuit is illustrated in FIGS. 10A and 10B. The turn on and off time of switch S4 is identical to the turn on and off time of switch S3.

The positive input of a comparator 30 is connected to the dot end of the secondary winding 2b. Its negative input is connected to a reference voltage, an example of 10V being shown in the Figures. The output of comparator 30 is used to control the operation of a switch 28. It is coupled to the switch via a delay circuit 31, which delays the positive edge of the output of comparator 30 (but not its negative edge). Two current sources 32, 34 are connected in series between switch S4 and switch 28. A voltage supply (not shown) is connected to the other terminal of switch S4. Capacitor 36 is connected in parallel with current source 34 and switch 28. A voltage-to-current converter 38 is connection between the midpoint of current sources 32, 34 and the opto-coupler 21.

Whilst Sb (S4) is on for the same period of time (minus delay ΔT; in steady state time t=0) that the voltage on the secondary side of the transformer 2 is positive (that is, in this example greater than 10V), the voltage on the capacitor 36 is in steady state. If the output current then increases, the duty cycle of Sb (and so that of S4) will also increase. The voltage across the capacitor will increase. As a result the current through the opto-coupler is also increased and communicated to the primary side via voltage-to-current converter 38. The primary side control will then increase the duty cycle of switch S1. Thus, the time for which the secondary side of the transformer is positive will increase, so the voltage across the capacitor will decrease again because switch 28 is now on for a longer time, until a new steady state is set. If the output current decreases, these changes will be reversed.

Figure 9:
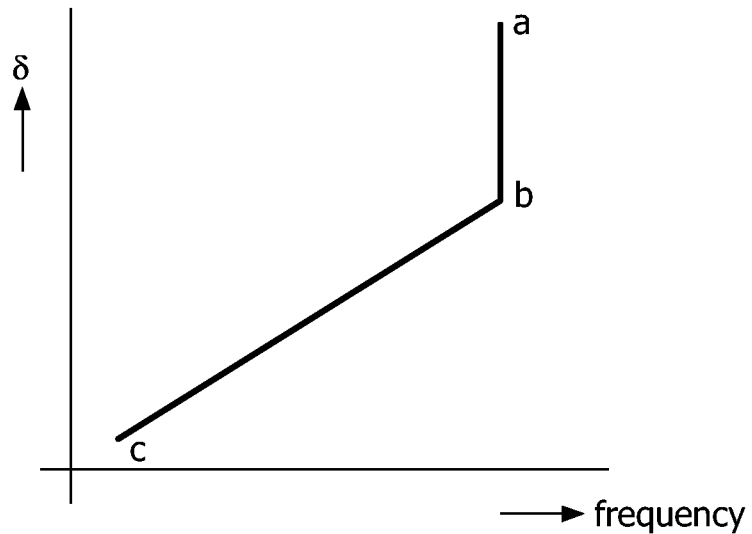
FIG. 9 shows a graph of duty cycle against operating frequency.

As shown in FIG. 9, when the secondary side controller determines that the primary side duty cycle (δ) has to be decreased, the current through the opto-coupler is decreased, as discussed above. As a result, the primary side controller will first reduce the on-time of switch S1, indicated in FIG. 9 by the line between points a and b. As in this period the on-time is reduced, the duty cycle is therefore reduced and the frequency stays constant.

Once the minimum on-time is detected on the primary side, the primary side controller will then increase the off-time of switch S1 when the current through the opto-coupler is further decreased. This results in a lower duty cycle and a lower frequency, indicated by the line between b and c. Once the primary side controller detects the minimum frequency, it will stop lowering its duty cycle to avoid going into the audible frequency spectrum.

The secondary control circuit 18 of FIG. 8A can be omitted when the voltage across primary main switch S1 is measured at the time it is turned on and used to adapt the primary main switch duty cycle. As mentioned before, the secondary switch Sb can be turned on before S1. The required output current is then delivered by the capacitor 24. A consequence is that when switch S1 is turned on by valley detection, its voltage, at that particular moment, depends on the amount of discharge of the capacitor. A discharge of the capacitor leads to a higher voltage across the primary main switch when it is turned on. This higher voltage can be detected and used to increase the duty cycle of the primary main switch.

Figure 11:
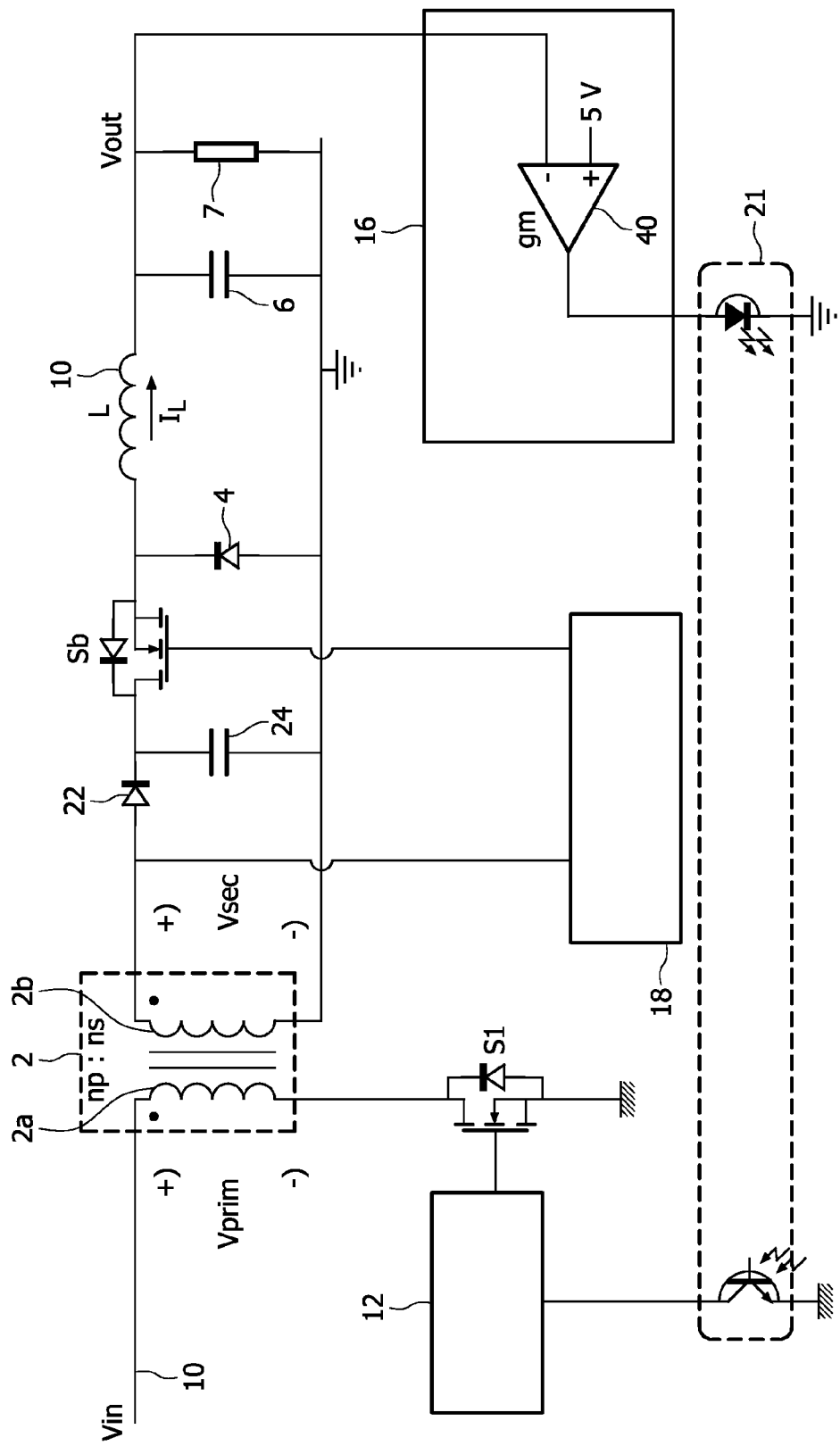
FIG. 11 shows a circuit diagram of a forward converter according to a third embodiment of the invention.

A further embodiment of the invention is illustrated in FIG. 11. The first regulation circuit 16 comprises a voltage to current converter 40. The output of the power converter circuit ($V_{OUT}$) is connected to the negative input of converter 40, and a reference voltage, say 5V, is connected to its positive input. Its output is coupled via an opto-coupler 21 to the primary side controller 12 and defines the duty cycle of S1.

Figure 12:
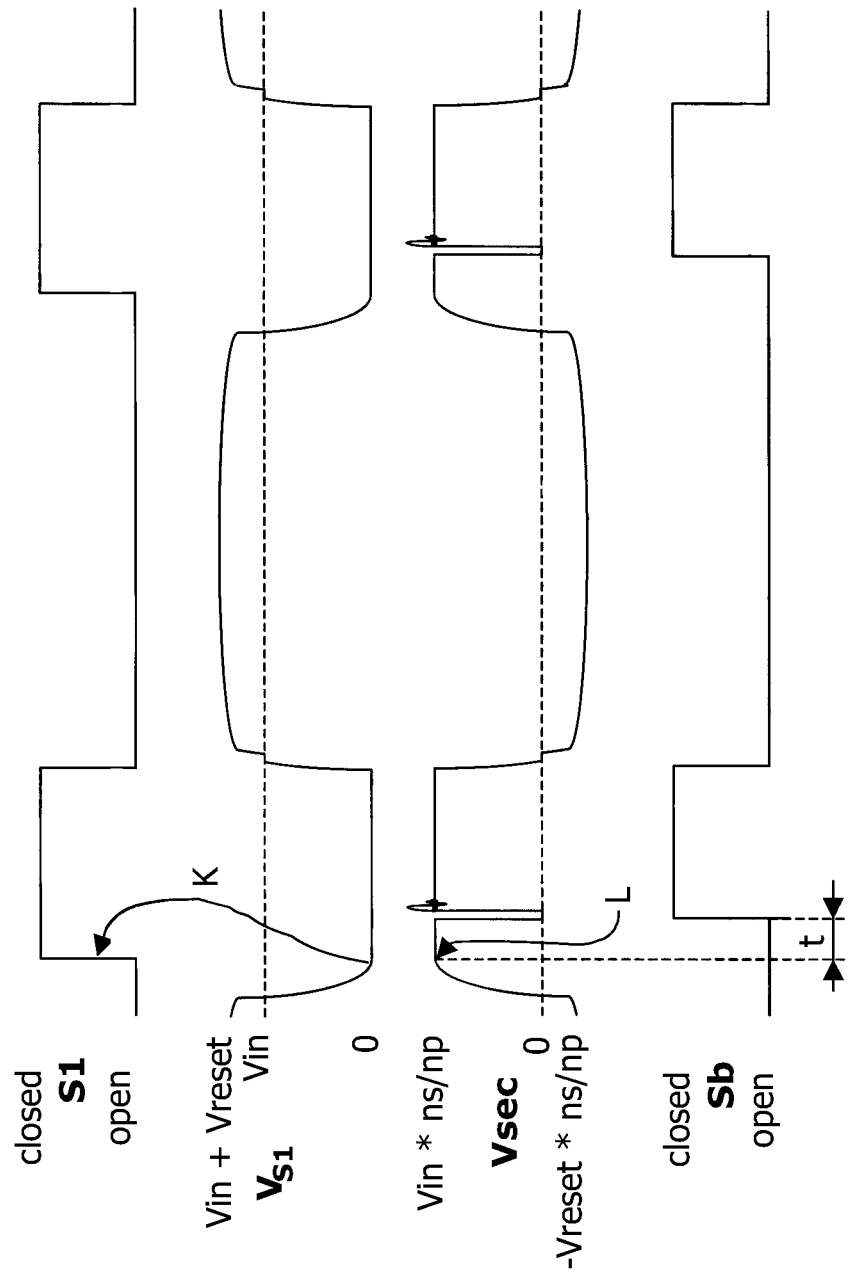
FIG. 12 shows exemplary waveforms generated during operation of the circuit shown in FIG. 11.

Waveforms generated by operation of the circuit shown in FIG. 11 are shown in FIG. 12. S1 turns on when valley detection senses that the voltage thereacross has fallen to a minimum value (point "K"). Controller 18 detects when primary switch S1 turns on via peak detection applied to signal Vsec (point "L"). A short time t (which may be zero) after point L, controller 18 turns on Sb. The duty cycle of S1 is defined by controller 16 by measuring the difference between Vout and a reference voltage (e.g. 5V is shown in FIG. 11).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalisation thereof, whether or not it relates to the same invention as present Claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

The invention claimed is:

1. A switched mode power converter including:
   a transformer having a primary winding and at least one secondary winding;
   a primary side active power switch device coupled to the primary winding for selectively applying an input voltage ($V_{in}$) to the primary winding;
   a secondary side rectifier circuit including an output filter coupled to the at least one secondary winding, and a secondary side active switch device coupled between the at least one secondary winding and the output filter; and
   primary side and secondary side control circuits for regulating the switching of the primary side and secondary side switches, respectively, and configured so as to reduce the duty cycle of the primary side switch device during a lower power mode of operation of the converter, the reduction of the duty cycle of the primary side switch being determined with reference to the duty cycle of the secondary side switches.

2. A converter of claim 1 wherein the converter is operable to selectively generate a continuous output current, and a discontinuous output current, the discontinuous output current being obtained by reducing the duty cycle of the secondary side switch device.

3. A converter of claim 1 wherein the primary side and secondary side control circuits are configured to reduce the operating frequency of the converter during the lower power mode relative to that during the higher power mode.

4. A converter of claim 1 wherein the secondary side control circuits are arranged to receive an input signal indicative of turn-on of the primary side switch, and generate an output signal dependent on said input signal and the turn-on time of the secondary side switch which is coupled to the primary side control circuit.

5. A converter of claim 4 wherein the secondary side control circuit is configured to receive a signal indicative of the voltage across the at least one secondary winding and determine the turn-on time of the primary side switch device therefrom.

6. A converter of claim 1 wherein a capacitive means is coupled between the drain of the secondary side switch device and ground.

7. A converter of claim 1 wherein the primary side control circuit includes a valley detection circuit for monitoring the voltage across the primary side switch device, the turn-on time of the primary side switch device being dependent on the output thereof.

8. A converter of claim 1 wherein the primary side and secondary side control circuits are configured to adjust the duty cycle of the primary side switch device such that it is substantially equal to that of the secondary side switch device during the lower power mode.

9. A switched mode power converter including:
   a transformer having a primary winding and at least one secondary winding;
   a primary side active power switch device coupled to the primary winding for selectively applying an input voltage (Vin) to the primary winding;
   a secondary side rectifier circuit including an output filter coupled to the at least one secondary winding, and a secondary side active switch device coupled between the at least one secondary winding and the output filter; and
   primary side and secondary side control circuits for regulating the switching of the primary side and secondary side switches, respectively, and configured so as to reduce the duty cycle of the primary side switch device during a lower power mode of operation of the converter, the reduction of the duty cycle of the primary side switch being determined with reference to the duty cycle of the secondary side switch;
   wherein a capacitive element is coupled between the drain of the secondary side switch device and ground; and
   wherein the primary side and secondary side control circuits are operable to adjust the switching of primary side switch device that its duty cycle is shorter than that of the secondary side switch device.

10. A personal computer (PC) power supply including a power converter of claim 1.

11. A method of operating a switched mode power converter including:
    a transformer having a primary winding and at least one secondary winding;
    a primary side active power switch device coupled to the primary winding for selectively applying an input voltage to the primary winding;
    a secondary side rectifier circuit including an output filter coupled to the at least one secondary winding, and a secondary side active switch device coupled between the at least one secondary winding and the output filter; and
    primary side and secondary side control circuits for regulating the switching of the respective switch device, the method comprising the step of reducing the duty cycle of the primary side switch device during a lower power mode relative to its duty cycle during a higher power mode of operation of the converter, the reduction of the duty cycle of the primary side switch being determined with reference to the duty cycle of the secondary side switch.

12. A method of claim 11 including the step of reducing the duty cycle of the secondary side switch device during a lower power mode of operation of the converter to generate a discontinuous output current.

* * * * *